(12) United States Patent
Weissman

(10) Patent No.: US 9,323,804 B2
(45) Date of Patent: *Apr. 26, 2016

(54) METHOD AND SYSTEM FOR ALLOWING ACCESS TO DEVELOPED APPLICATIONS VIA A MULTI-TENANT ON-DEMAND DATABASE SERVICE

(71) Applicant: salesforce.com, inc, San Francisco, CA (US)

(72) Inventor: Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/865,896

(22) Filed: Apr. 18, 2013

(65) Prior Publication Data

US 2013/0238655 A1 Sep. 12, 2013

Related U.S. Application Data

(63) Continuation of application No. 12/763,078, filed on Apr. 19, 2010, now Pat. No. 9,171,034, which is a continuation of application No. 11/859,498, filed on Sep. 21, 2007, now Pat. No. 7,730,478.

(60) Provisional application No. 60/828,757, filed on Oct. 9, 2006, provisional application No. 60/828,192, filed on Oct. 4, 2006.

(51) Int. Cl.
*G06F 9/44* (2006.01)
*G06F 9/445* (2006.01)
*G06F 17/30* (2006.01)
*G06F 11/36* (2006.01)
*G06F 21/62* (2013.01)

(52) U.S. Cl.
CPC ........... *G06F 17/30386* (2013.01); *G06F 8/30* (2013.01); *G06F 8/60* (2013.01); *G06F 11/3604* (2013.01); *G06F 21/6218* (2013.01); *G06F 21/6227* (2013.01)

(58) Field of Classification Search
None
See application file for complete search history.

(56) References Cited

U.S. PATENT DOCUMENTS 5,263,155 A 11/1993 Wang
5,481,735 A 1/1996 Mortensen et al.
(Continued)

FOREIGN PATENT DOCUMENTS

JP 2005174283 A 6/2005
JP 2007538313 A 12/2007
WO WO2005106666 A1 11/2005

OTHER PUBLICATIONS

Non-Final Office Action from U.S. Appl. No. 12/167,913, dated Apr. 22, 2011.
(Continued)

*Primary Examiner* — Jason Mitchell

(57) ABSTRACT

In accordance with embodiments, there are provided mechanisms and methods for allowing access to developed applications via a multi-tenant on-demand database service, in a controlled environment. These mechanisms and methods for providing such access can enable embodiments to provide additional control over the development process as well as the access of such developed applications. The ability of embodiments to provide such additional control may lead to an improved application development framework, etc.

13 Claims, 8 Drawing Sheets

(56) References Cited

U.S. PATENT DOCUMENTS

| | | | |
|---|---|---|---|
| 5,504,879 A * | 4/1996 | Eisenberg et al. | |
| 5,561,797 A | 10/1996 | Gilles et al. | |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,737,609 A | 4/1998 | Reed et al. | |
| 5,761,419 A | 6/1998 | Schwartz et al. | |
| 5,768,592 A * | 6/1998 | Chang | 438/758 |
| 5,778,169 A | 7/1998 | Reinhardt | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,870,590 A | 2/1999 | Kita et al. | |
| 5,870,606 A | 2/1999 | Lindsey | |
| 5,873,086 A * | 2/1999 | Fujii et al. | |
| 5,873,096 A | 2/1999 | Lim et al. | |
| 5,890,156 A * | 3/1999 | Rekieta et al. | 707/610 |
| 5,913,023 A | 6/1999 | Szermer | |
| 5,918,159 A | 6/1999 | Fomukong et al. | |
| 5,920,863 A * | 7/1999 | McKeehan et al. | 718/101 |
| 5,956,716 A * | 9/1999 | Kenner et al. | |
| 5,963,953 A | 10/1999 | Cram et al. | |
| 6,016,495 A | 1/2000 | McKeehan et al. | |
| 6,021,438 A | 2/2000 | Duvvoori et al. | |
| 6,029,177 A * | 2/2000 | Sadiq et al. | |
| 6,041,228 A | 3/2000 | Niska et al. | |
| 6,044,216 A | 3/2000 | Bhargava et al. | |
| 6,092,083 A | 7/2000 | Brodersen et al. | |
| 6,138,112 A | 10/2000 | Slutz | |
| 6,144,960 A * | 11/2000 | Okada | G06F 8/61 |
| 6,148,296 A * | 11/2000 | Tabbara | |
| 6,157,935 A | 12/2000 | Tran et al. | |
| 6,161,149 A | 12/2000 | Achacoso et al. | |
| 6,163,878 A * | 12/2000 | Kohl | 717/100 |
| 6,167,534 A * | 12/2000 | Straathof et al. | 714/38.1 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,237,001 B1 * | 5/2001 | Bamford et al. | |
| 6,256,659 B1 * | 7/2001 | McLain et al. | 718/100 |
| 6,266,669 B1 | 7/2001 | Brodersen et al. | |
| 6,289,382 B1 | 9/2001 | Bowman-Amuah | |
| 6,295,530 B1 | 9/2001 | Ritchie et al. | |
| 6,311,207 B1 * | 10/2001 | Mighdoll et al. | 709/203 |
| 6,324,568 B1 | 11/2001 | Diec | |
| 6,324,693 B1 | 11/2001 | Brodersen et al. | |
| 6,336,137 B1 | 1/2002 | Lee et al. | |
| 6,343,287 B1 * | 1/2002 | Kumar et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,442,748 B1 * | 8/2002 | Bowman-Amuah | 717/108 |
| 6,446,089 B1 | 9/2002 | Brodersen et al. | |
| 6,453,362 B1 * | 9/2002 | Bittinger et al. | 719/316 |
| 6,535,909 B1 | 3/2003 | Rust | |
| 6,536,036 B1 | 3/2003 | Pavela | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,600,735 B1 | 7/2003 | Iwama et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,651,073 B1 * | 11/2003 | Lyle et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,883,015 B1 * | 4/2005 | Geen et al. | 709/203 |
| 6,895,577 B1 | 5/2005 | Noble et al. | |
| 6,947,952 B1 | 9/2005 | Welch et al. | |
| 6,957,259 B1 * | 10/2005 | Malik | 709/225 |
| 6,959,433 B1 * | 10/2005 | Morales et al. | 717/127 |
| 6,963,899 B1 * | 11/2005 | Fernandez et al. | 709/203 |
| 6,965,919 B1 * | 11/2005 | Woods et al. | 709/206 |
| 7,039,899 B1 | 5/2006 | Quiroga | |
| 7,058,622 B1 * | 6/2006 | Tedesco | |
| 7,058,924 B2 * | 6/2006 | Greenstein | 717/100 |
| 7,062,502 B1 | 6/2006 | Kesler | |
| 7,069,231 B1 | 6/2006 | Cinarkaya et al. | |
| 7,093,261 B1 * | 8/2006 | Harper et al. | 719/310 |
| 7,139,758 B1 * | 11/2006 | Laws et al. | |
| 7,181,758 B1 | 2/2007 | Chan | |
| 7,203,700 B1 * | 4/2007 | Kumar et al. | |
| 7,213,013 B1 * | 5/2007 | Subramaniam et al. | 707/610 |
| 7,213,175 B2 | 5/2007 | Morrison et al. | |
| 7,289,976 B2 | 10/2007 | Kihneman et al. | |
| 7,293,011 B1 * | 11/2007 | Bedi et al. | |
| 7,296,274 B2 * | 11/2007 | Cohen et al. | 719/315 |
| 7,299,452 B1 | 11/2007 | Zhang et al. | |
| 7,302,400 B2 * | 11/2007 | Greenstein | 705/7.12 |
| 7,302,431 B1 * | 11/2007 | Apollonsky et al. | |
| 7,340,411 B2 | 3/2008 | Cook | |
| 7,349,980 B1 * | 3/2008 | Darugar et al. | 709/238 |
| 7,356,482 B2 | 4/2008 | Frankland et al. | |
| 7,363,629 B2 * | 4/2008 | Springer et al. | 719/314 |
| 7,373,106 B2 | 5/2008 | Ikeda | |
| 7,401,094 B1 | 7/2008 | Kesler | |
| 7,412,455 B2 | 8/2008 | Dillon | |
| 7,437,704 B2 * | 10/2008 | Dahne-Steuber et al. | 717/100 |
| 7,444,518 B1 | 10/2008 | Dharmarajan et al. | |
| 7,464,015 B2 | 12/2008 | Iwashita | |
| 7,493,592 B2 | 2/2009 | Karatal et al. | |
| 7,508,789 B2 | 3/2009 | Chan | |
| 7,562,119 B2 | 7/2009 | Smith et al. | |
| 7,620,655 B2 | 11/2009 | Larsson et al. | |
| 7,647,597 B2 * | 1/2010 | Krishnaswamy et al. | 719/319 |
| 7,698,160 B2 | 4/2010 | Beaven et al. | |
| 7,725,501 B1 | 5/2010 | Stillman et al. | |
| 7,730,478 B2 * | 6/2010 | Weissman | G06F 21/6218 717/100 |
| 7,730,482 B2 * | 6/2010 | Illowsky et al. | 717/177 |
| 7,779,039 B2 | 8/2010 | Weissman et al. | |
| 7,853,948 B2 | 12/2010 | Berstis et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,312,422 B2 | 11/2012 | Karatal et al. | |
| 8,457,545 B2 | 6/2013 | Chan | |
| 8,484,111 B2 | 7/2013 | Frankland et al. | |
| 8,880,619 B2 | 11/2014 | Van Wely | |
| 9,171,033 B2 | 10/2015 | Weissman | |

(56) References Cited

U.S. PATENT DOCUMENTS

| | | |
|---|---|---|
| 2001/0044791 A1 | 11/2001 | Richter et al. |
| 2002/0013827 A1* | 1/2002 | Edstrom et al. ............... 709/219 |
| 2002/0022986 A1 | 2/2002 | Coker et al. |
| 2002/0023173 A1* | 2/2002 | Jacobs et al. .................. 709/245 |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0048054 A1* | 4/2002 | Ohata et al. .................... 358/500 |
| 2002/0072951 A1 | 6/2002 | Lee et al. |
| 2002/0082892 A1 | 6/2002 | Raffel et al. |
| 2002/0083183 A1* | 6/2002 | Pujare et al. .................. 709/231 |
| 2002/0128037 A1 | 9/2002 | Schmidt |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0169776 A1* | 11/2002 | Tuunanen et al. ................. 707/9 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0036919 A1 | 2/2003 | Felt et al. |
| 2003/0065738 A1* | 4/2003 | Yang et al. ..................... 709/215 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1* | 5/2003 | Subramaniam et al. ........... 707/3 |
| 2003/0093518 A1 | 5/2003 | Hiraga |
| 2003/0093716 A1 | 5/2003 | Farchi et al. |
| 2003/0097360 A1* | 5/2003 | McGuire et al. .................. 707/8 |
| 2003/0120675 A1 | 6/2003 | Stauber et al. |
| 2003/0126139 A1 | 7/2003 | Lee et al. |
| 2003/0151633 A1 | 8/2003 | George et al. |
| 2003/0159063 A1* | 8/2003 | Apfelbaum et al. .......... 713/200 |
| 2003/0159089 A1 | 8/2003 | DiJoseph |
| 2003/0159136 A1 | 8/2003 | Huang et al. |
| 2003/0187921 A1 | 10/2003 | Diec |
| 2003/0189600 A1 | 10/2003 | Gune et al. |
| 2003/0196188 A1 | 10/2003 | Kuzmin |
| 2003/0200309 A1 | 10/2003 | Ohhashi et al. |
| 2003/0200460 A1 | 10/2003 | Morota et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0226060 A1 | 12/2003 | Das et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0025093 A1 | 2/2004 | Willy et al. |
| 2004/0027388 A1 | 2/2004 | Berg et al. |
| 2004/0040014 A1 | 2/2004 | Ball |
| 2004/0088602 A1* | 5/2004 | Cohen et al. .................... 714/38 |
| 2004/0093371 A1* | 5/2004 | Burrows et al. .............. 709/201 |
| 2004/0098704 A1 | 5/2004 | Becker et al. |
| 2004/0103396 A1 | 5/2004 | Nehab |
| 2004/0117654 A1 | 6/2004 | Feldman et al. |
| 2004/0128001 A1 | 7/2004 | Levin et al. |
| 2004/0128584 A1 | 7/2004 | Mandava et al. |
| 2004/0167689 A1 | 8/2004 | Bromley et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267719 A1* | 12/2004 | Doherty et al. ................... 707/3 |
| 2004/0268299 A1 | 12/2004 | Lei et al. |
| 2005/0015675 A1* | 1/2005 | Kolawa et al. .................. 714/38 |
| 2005/0028146 A1 | 2/2005 | Quick |
| 2005/0050555 A1 | 3/2005 | Exley et al. |
| 2005/0081106 A1 | 4/2005 | Chang et al. |
| 2005/0091098 A1 | 4/2005 | Brodersen et al. |
| 2005/0091670 A1 | 4/2005 | Karatal et al. |
| 2005/0132329 A1* | 6/2005 | Suwanda ....................... 717/120 |
| 2005/0172302 A1* | 8/2005 | Chan et al. ..................... 719/315 |
| 2005/0188345 A1* | 8/2005 | Chang et al. ................... 717/101 |
| 2005/0223022 A1 | 10/2005 | Weissman et al. |
| 2005/0229044 A1 | 10/2005 | Ball |
| 2005/0246338 A1* | 11/2005 | Bird ................................. 707/9 |
| 2005/0256884 A1* | 11/2005 | Arnold et al. ................... 707/10 |
| 2006/0021019 A1 | 1/2006 | Hinton et al. |
| 2006/0031359 A1* | 2/2006 | Clegg et al. .................... 709/206 |
| 2006/0070048 A1 | 3/2006 | Li et al. |
| 2006/0074938 A1 | 4/2006 | Miller |
| 2006/0122966 A1 | 6/2006 | Fecht et al. |
| 2006/0155521 A1 | 7/2006 | Iwashita |
| 2006/0159067 A1 | 7/2006 | Chen et al. |
| 2007/0016676 A1 | 1/2007 | Breuer et al. |
| 2007/0061782 A1 | 3/2007 | Schreiner et al. |
| 2007/0130106 A1* | 6/2007 | Gadiraju ........................... 707/2 |
| 2007/0203910 A1* | 8/2007 | Ferguson et al. .................. 707/8 |
| 2008/0059441 A1* | 3/2008 | Gaug et al. ....................... 707/4 |
| 2008/0098486 A1 | 4/2008 | Lin et al. |
| 2008/0120602 A1 | 5/2008 | Comstock et al. |
| 2008/0177879 A1 | 7/2008 | Krishnan et al. |
| 2008/0249972 A1 | 10/2008 | Dillon |
| 2008/0270354 A1* | 10/2008 | Weissman ......................... 707/2 |
| 2008/0270992 A1 | 10/2008 | Georgieva et al. |
| 2008/0292065 A1 | 11/2008 | Chen et al. |
| 2009/0013310 A1* | 1/2009 | Arner et al. .................... 717/120 |
| 2009/0019427 A1 | 1/2009 | Li et al. |
| 2009/0019428 A1 | 1/2009 | Li et al. |
| 2009/0063415 A1 | 3/2009 | Chatfield et al. |
| 2009/0100342 A1 | 4/2009 | Jakobson |
| 2009/0125822 A1 | 5/2009 | Karatal et al. |
| 2009/0177744 A1 | 7/2009 | Marlow et al. |
| 2009/0328050 A1 | 12/2009 | Liu et al. |
| 2010/0174784 A1 | 7/2010 | Levey et al. |
| 2011/0218958 A1 | 9/2011 | Warshavsky et al. |
| 2011/0247051 A1 | 10/2011 | Bulumulla et al. |
| 2011/0289356 A1 | 11/2011 | Hossain et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

Final Office Action from U.S. Appl. No. 12/167,913, dated Feb. 10, 2012.

Final Office Action from U.S. Appl. No. 12/167,913, dated Aug. 20, 2013.

Non-Final Office Action from U.S. Appl. No. 12/167,913, dated Mar. 14, 2013.

Non-Final Office Action from U.S. Appl. No. 12/167,913, dated Apr. 25, 2014.

Final Office Action from U.S. Appl. No. 12/167,918, dated Aug. 6, 2016.

Final Office Action from U.S. Appl. No. 12/167,918, dated Dec. 2, 2011.

Non-Final Office Action from U.S. Appl. No. 12/167,918, dated Feb. 27, 2013.

Non-Final Office Action from U.S. Appl. No. 12/167,918, dated Apr. 18, 2014.

Non-Final Office Action from U.S. Appl. No. 12/167,918, dated Jul. 5, 2011.

(56) References Cited

OTHER PUBLICATIONS

Non-Final Office Action from U.S. Appl. No. 12/167,918, dated Feb. 12, 2015.
Final Office Action from U.S. Appl. No. 12/167,918, dated Oct. 15, 2014.
Office Action from Japanese Patent Application No. 2013-209459, dated Oct. 7, 2014.
Yamamoto, T. et al., "The era of 'On-demand CRM' experiencing utility computing models," COMPUTERWORLD Get Technology Right, IDG Japan, May 1, 2005, vol. 2, No. 5, pp. 90-97.
Examiner's Decision to Refuse from Japanese Patent Application No. 2013-209459, dated Aug. 11, 2015.
Examination Report from European Application No. 12 169 103.4, dated Jun. 8, 2015.

* cited by examiner

METHOD AND SYSTEM FOR ALLOWING ACCESS TO DEVELOPED APPLICATIONS VIA A MULTI-TENANT ON-DEMAND DATABASE SERVICE

CLAIM OF PRIORITY

This application is a continuation of U.S. application Ser. No. 12/763,078, filed Apr. 19, 2010, which is continuation of U.S. application Ser. No. 11/859,498, filed Sep. 21, 2007, which claims the benefit of U.S. Provisional Application No. 60/828,757, filed Oct. 9, 2006, and U.S. Provisional Application No. 60/828,192, filed Oct. 4, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to developer frameworks, and more particularly to developing applications in an improved manner.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to develop various applications for extending capabilities of the aforementioned database systems. To date, however, such applications have typically been developed in an uncontrolled environment. For example, developers conventionally dictate the development of such applications, leaving the database system service with less control. This, in turn, may lead to various shortcomings in the development process, etc. For instance, various development best practices (e.g. with respect to testing, resource allocation, etc.) may not necessarily be enforced, since they are under the control of the developer.

BRIEF SUMMARY

In accordance with embodiments, there are provided mechanisms and methods for allowing access to developed applications via a multi-tenant on-demand database service, in a controlled environment. These mechanisms and methods for providing such access can enable embodiments to provide additional control over the development process as well as the access of such developed applications. The ability of embodiments to provide such additional control may lead to an improved application development/runtime framework, etc.

In an embodiment and by way of example, a method is provided for allowing access to developed applications via a multi-tenant on-demand database service, in a controlled environment. In use, developed applications are received at a multi-tenant on-demand database service. Access to the applications is provided to tenants of the on-demand database service. Such applications are under the control of the on-demand database service.

While the present invention is described with reference to an embodiment in which techniques for allowing access to developed applications are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for allowing access to developed applications via a multi-tenant on-demand database service, in a controlled environment. Further, systems and methods are provided for extending an interface that executes with the on-demand database service.

In the development of applications for use with database systems, many challenges exist that result from the fact that the control of such application development rests with the developer. For example, various development best practices (e.g. with respect to testing, resource allocation, etc.) are not necessarily enforced, since they are under the control of the developer. Thus, mechanisms and methods are provided herein for allowing access to developed applications via a multi-tenant on-demand database service, in a controlled environment. The ability of embodiments to provide such additional control may lead to an improved development/runtime framework, etc. For example, by administering control over the development process, etc., embodiments are enabled whereby interfaces (e.g. API's, etc.) may be extended in a more affective manner.

Next, mechanisms and methods will be described for allowing access to developed applications in a controlled environment, as well as extending an interface that executes with an on-demand database service.

Figure 1A:
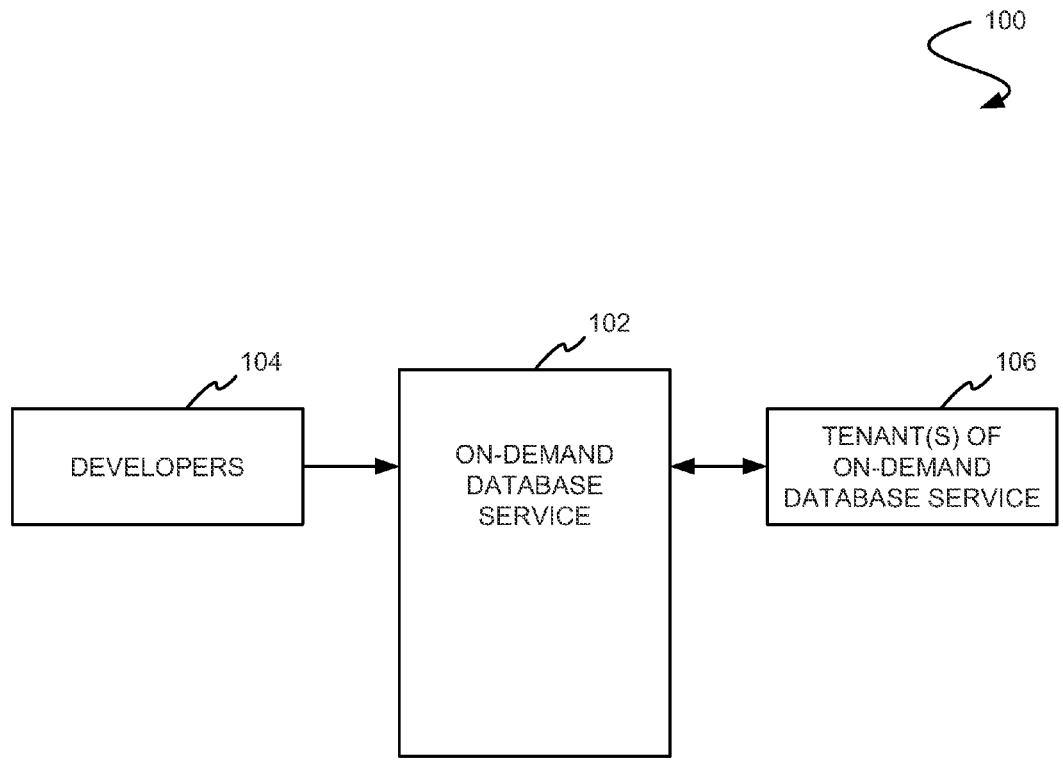
FIG. 1A illustrates a system for allowing access to developed applications via an on-demand database service, in accordance with one embodiment.

FIG. 1A illustrates a system 100 for allowing access to developed applications via an on-demand database service 102, in accordance with one embodiment. In the context of the present description, an on-demand database service may include any service that relies on a database system that is accessible over a network.

In one embodiment, the on-demand database service 102 may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

As shown, the on-demand database service 102 communicates with a plurality of developers 104. In use, the on-demand database service 102 is adapted to receive developed applications from the developers 104. In the context of the present description, the developers 104 may include any one or more persons or entities (e.g. corporation, organization, etc.) that develop computer code. Further, the applications may include any computer code (e.g. a complete program, a partial program, a code segment, etc.).

In addition, the on-demand database service 102 communicates with one or more tenants 106 of the on-demand database service 102. In the aforementioned embodiment where the on-demand database service 102 includes a multi-tenant on-demand database service, a plurality of the tenants 106 may exist. In any case, a tenant refers to any one or more persons or entities that are capable of accessing the on-demand database service 102, in the present description. For example, the tenant(s) 106 may subscribe to the on-demand database service 102.

By this design, the on-demand database service 102 serves to provide access to the applications to the tenant(s) 106 of the on-demand database service 102. In use, the aforementioned applications are under the control of the on-demand database service 102. By administering such control, an improved development/runtime framework, etc. is thereby provided.

In various embodiments, such control may be administered in any desired manner. For example, the on-demand database service 102 may enforce any desired policies by precluding access to applications by the tenant(s) 106, in situations where the applications do not adhere to the policies. In other embodiments, the on-demand database service 102 may enforce such policies by precluding or limiting functionality accessible to the developers 104, in such non-compliant scenario. For example, publication of an application to the on-demand database service 102 may be disallowed in the absence of meeting certain requirements. In one specific embodiment, the on-demand database service 102 may monitor and limit various aspects of the applications and terminate related code, based on a dynamic contextual limiter. Of course, the foregoing control may be implemented in any desired manner.

In one embodiment, the aforementioned control may take the form of limiting at least one aspect of the applications by the on-demand database service 102. For instance, such aspect may relate to processing, storage, bandwidth, etc. resources made available to the applications of the developers 104. By this design, the on-demand database service 102 may be able constrain the developers in a way that optimizes the ability of the on-demand database service 102 to service the tenant(s) 106 via the applications.

In various embodiments, such resources-related aspect may involve a database associated with the on-demand database service 102, a manner in which such database may be accessed utilizing the applications, etc. In such embodiments, the foregoing aspect may include, but is not limited to a number of columns of a database, a number of queries to a database in a predetermined timeframe, a number of rows returned by queries, a number of database statements (e.g. modification statements, etc.), a number of script statements between database statements, a number of rows processed (e.g. modified, etc.) in a predetermined timeframe, a number of transaction statements, a total number of uncommitted rows since a last transaction control statement, a total number of script statements since a last database call, a duration of processing, etc.

Of course, such exemplary list is not to be construed as limiting. For example, any aspect of the on-demand database service 102 (e.g. electronic mail management, etc.) may also be limited as well. In one specific instance, a number of e-mails one can send per request and/or a number of outbound web service calls made per request, may be limited. In various embodiments, limits may be applied to an application on a per-request basis or on a per-time-period (e.g. per day) basis. In the latter embodiment, such limitation may apply on a per-user or per-tenant basis.

In other embodiments, a development of the applications may be controlled. For example, the applications are controlled by imposing requirements of the on-demand database service 102 that the applications be tested (e.g. validated, etc.). Such testing may, in one embodiment, be natively run in an automated manner, by way of a call made to an application program interface associated with the on-demand database service 102.

In other aspects of the present embodiment involving development controls, the on-demand database service 102 may require that functional tests be written for applications and further require a predetermined percentage of code coverage. In this embodiment, such technique may allow one to run such tests whenever the on-demand database service 102 is modified, to reduce the risk of accidentally breaking working applications. By this design, regression and/or any other negative traits may be avoided. More information regarding one possible embodiment involving such controlled testing will be set forth in greater detail during reference to FIG. 1B.

In still additional embodiments, access to the applications by the tenant(s) 106 of the on-demand database service 102 may be controlled. For instance, a single instance of each application may be instantiated among a plurality of the tenant(s) 106 of the on-demand database service 102. Thus, only a single copy of the application need be stored by the on-demand database service 102, and simultaneously shared amongst the tenant(s) 106 in the foregoing manner.

It should be that the forgoing control may be static or dynamic, may or may not be uniformly applied, etc. For example, the foregoing aspects and related control criteria may or may not be different for different applications, tenants 106, etc. Just by way of example, the on-demand database service 102 may allow for more resources when running an upgrade script, with respect to when running a per-row database trigger, etc. Further, the on-demand database service 102 may allow for more resources for large tenants 106, etc.

Figure 1B:
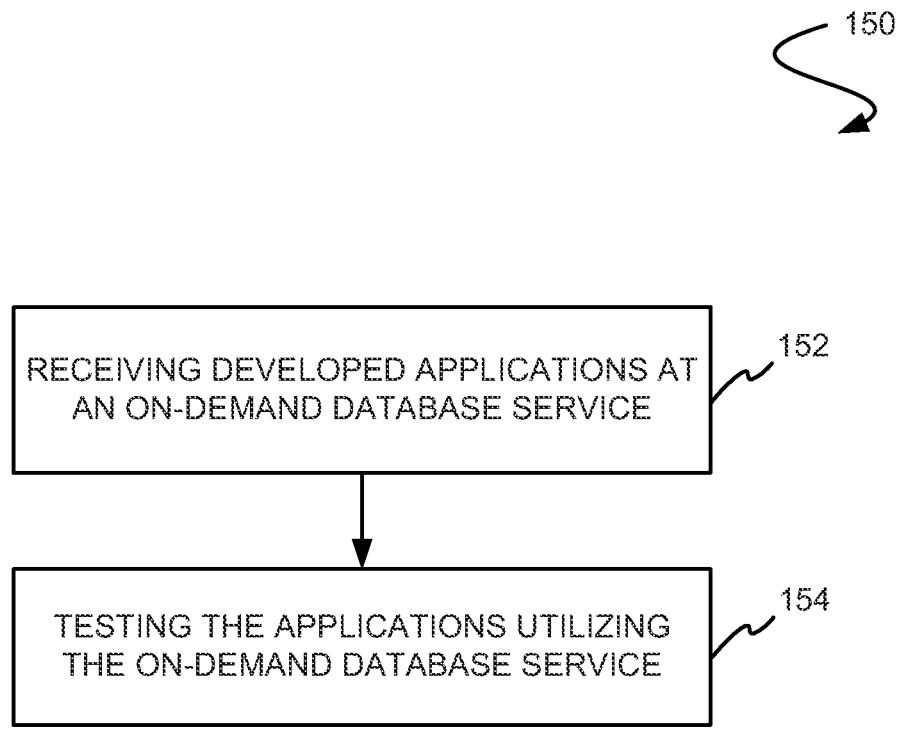
FIG. 1B shows a method for testing developed applications utilizing an on-demand database service.

FIG. 1B shows a method 150 for testing developed applications utilizing an on-demand database service. As an option, the present method 150 may be implemented in the context of the on-demand database service 102 of FIG. 1A. Of course, however, the method 150 may be carried out in any desired environment. The aforementioned definitions may apply during the present description.

As shown, developed applications are received at an on-demand database service. See operation 152. In various embodiments, the on-demand database service may or may not include a multi-tenant on-demand database service.

Further, the developed applications may be received in whole or in part. For example, in one embodiment, an application may be developed utilizing a separate system and may be subsequently uploaded to the on-demand database service. In other embodiments, code segments of the application may be received at the on-demand database service as the application is being developed. Of course, hybrid systems are further contemplated which employ both of the foregoing frameworks. Still yet, the aforementioned receipt of developed applications may or may not occur over a network.

With continuing reference to FIG. 1B, the applications may be tested utilizing the on-demand database service. See operation 154. In the context of the present description, such testing may relate to any process for assessing at least one aspect of the applications. For example, such aspect may include, but is not limited to operability, quality, efficiency (e.g. with respect to resource requirements, etc.), etc. In various different embodiments, the testing may be for debugging purposes, identifying unwanted deadlock situations, enforcing database semantics, and/or any desired rules, for that matter.

In a particular embodiment, the foregoing testing may involve a unit test. Such unit test may verify whether a particular piece of code of an application is working properly. As an option, the unit test may take no arguments, commit no data to a database, etc. In other embodiments, tests may be employed which cover as many lines of code as possible, and, in the case of conditional logic (including ternary operators), execute each branch of code logic. Further, the tests may be designed to complete successfully without throwing any exceptions, unless those errors are expected and caught. Still yet, tests may be configured to liberally make use of "System.assert( )" methods to prove that code behaves properly, exercise bulk trigger functionality, etc.

In one embodiment, the testing may be controlled by the on-demand database service. For example, all testing may be under the control of the on-demand database service. In other embodiments, only some of the testing may be under the control of the on-demand database service. In such embodiment, a first subset of the testing may be controlled by developers of the applications, and a second subset of the testing may be controlled by the on-demand database service.

Further, the testing may occur at any desired time. For instance, the testing may be periodic, on-demand, triggered by an event or milestone, etc. In one example, the testing may occur automatically across all relevant applications upon at least one aspect (e.g. code, feature, etc.) of the on-demand database service being added, upgraded, etc. To this end, continued operation of the applications on the on-demand database service is ensured.

In another embodiment, the testing may be required by the on-demand database service. Such requirement may be enforced in any desired manner (e.g. see, again, the aforementioned exemplary enforcement techniques, etc.). As an option, it may be determined whether at least one of the applications has passed the testing. To this end, access to such application(s) may be conditionally provided, based on the determination. For example, access may be provided to the application(s), if it is determined that the application(s) has passed the testing. Further, such access to the application(s) may be precluded, if it is determined that the application(s) has not passed the testing. As an option, a report may be provided to indicate an extent and/or manner in which the testing was passed or failed, so that appropriate action may be taken by the application developer.

A definition of requirements for such pass may be configured in any desired manner. For example, such pass criteria may be defined by the on-demand database service. Further, the criteria may involve any desired parameters, thresholds, etc. To this end, a managed code environment is provided that requires application developers to give up some control over the development process, in exchange for the benefit of standardized improvements in applications available via the on-demand database service.

Figure 2:
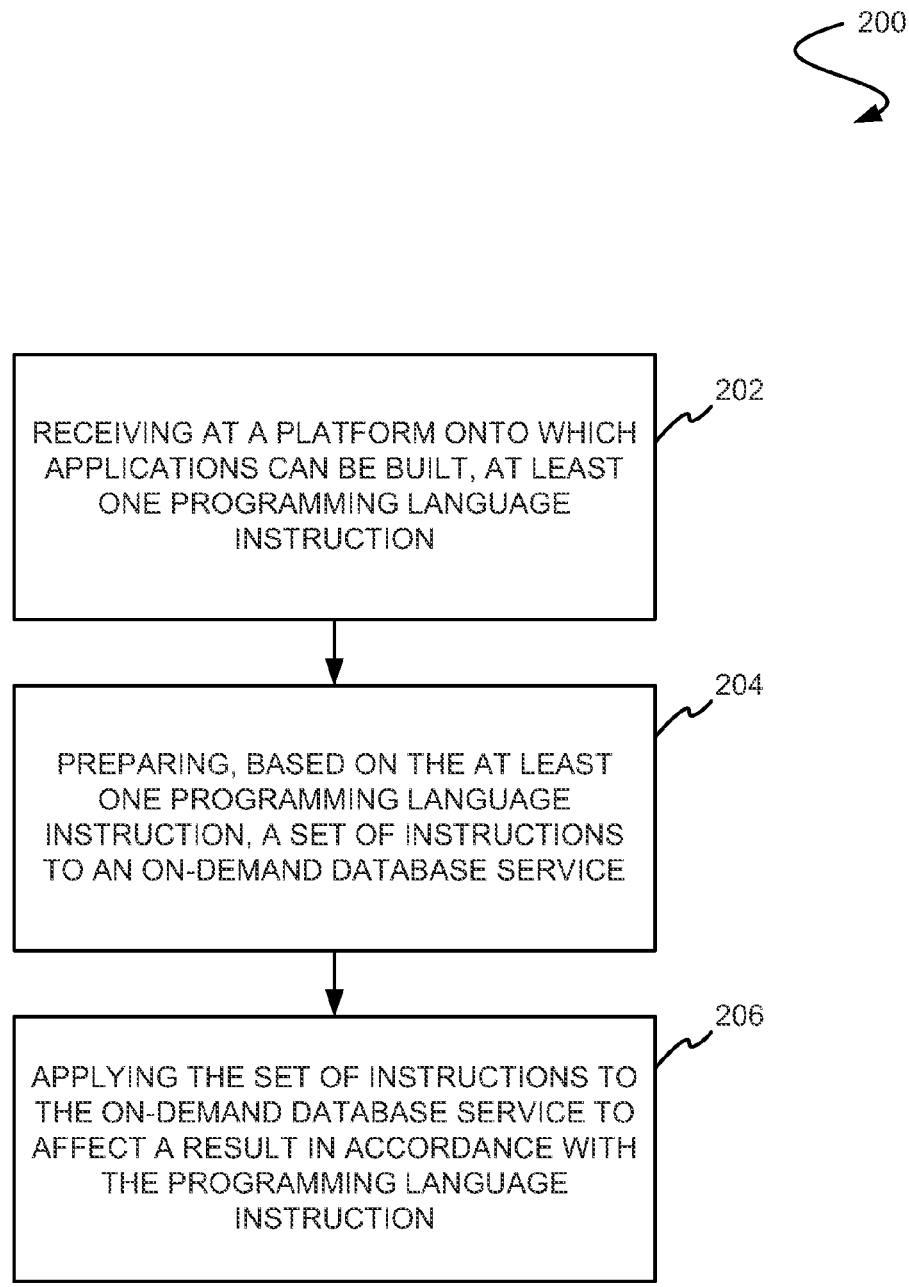
FIG. 2 shows a method for extending an interface that executes with an on-demand database service.

FIG. 2 shows a method 200 for extending an interface that executes with an on-demand database service. As an option, the present method 200 may be implemented in the context of the on-demand database service 102 of FIG. 1A. In various embodiments, the on-demand database service may or may not include a multi-tenant on-demand database service. Of course, however, the method 200 may be carried out in any desired environment. The aforementioned definitions may apply during the present description.

As shown, at least one programming language instruction is received at a platform on which applications can be built. See operation 202. The receipt of such instruction may be accomplished in any desired manner. For example, the at least one programming language instruction may or may not be received at an API associated with the platform.

In various embodiments, such platform may or may not be part of the on-demand database service 102 of FIG. 1, and may be adapted for sharing applications. It should be noted, however, the platform may include any hardware and/or software that is capable of allowing applications to be built. Of course, such applications may or may not be built by third parties (e.g. parties other than that associated with the platform, etc.).

In the context of the present description, the foregoing applications may include any desired software, and such application may be built in any desired manner. For example, in various embodiments, such "building" may range from providing a forum to manage the entire or a portion of the development process, to simply making a pre-existing application accessible for use, etc. Still yet, in the present description, the aforementioned programming language instruction may include any piece of code recognizable by the platform.

With continuing reference to FIG. 2, a set of instructions to an on-demand database service may be prepared, based on the at least one programming language instruction. See operation 204. In the context of the present description, the set of instructions may include any code that is recognizable by the on-demand database service.

In other embodiments where the on-demand database service has the ability to call out to other external systems, the set of instructions may refer to instructions to another system via the on-demand database service. More information regarding such call out feature may be found with reference to U.S. patent application Ser. No. 11/778,587 entitled "METHOD AND SYSTEM FOR PROVIDING A CLIENT ACCESS TO AN EXTERNAL SERVICE VIA AN APPLICATION SERVICES PLATFORM," by Manoj Cheenath et al., filed Jul. 16, 2007, the entire contents of which are incorporated herein by reference. Further, the aforementioned controls may be applied to any call out request to such external systems. For example, such call out request may be given a lower priority (e.g. disallowed during a low level database operations involving locks, etc.).

In one embodiment involving a multi-tenant on-demand database service, the set of instructions may be configured to be applied to all tenants. In another embodiment, the set of instructions may be tenant-specific. In other words, the set of instructions may be prepared to query for information related to a single tenant (or subset of tenants) selected from the tenants storing data utilizing the on-demand database service.

To this end, the set of instructions may be applied (e.g. to the on-demand database service) to affect a result, in accordance with the programming language instruction. See operation 206. In various embodiments, the set of instructions may be applied to provide a result set from the on-demand database service, updating data in the on-demand database service, and/or performing any desired action or altering an existing action, in accordance with the programming language instruction. In one particular embodiment, the set of instructions may be applied to extend an interface (e.g. API, graphical user interface, etc.) of the on-demand database service in any desired manner.

Various possible features may be enabled by the foregoing extension technique. In one embodiment, the set of instructions may be applied to run a set of multi-object manipulations at the on-demand database service responsive to a single transaction. For example, the manipulation of multiple objects which previously required multiple transactions, may, after the extension, require a single transaction.

An example of the method 200 of FIG. 2 will now be set forth in the context of the on-demand database service 102 of FIG. 1A that incorporates the aforementioned platform. In such example, the instruction of operation 202 may be received at the on-demand database service 102 from the developer 104. Thereafter, the on-demand database service 102 may prepare the set of instructions of operation 204. To this end, such set of instructions of operation 204 may be applied by the on-demand database service 102, in conjunction with use of an application by the tenant(s) 106. By this design, any desired aspect of the on-demand database service 102 (e.g. one of the applications, etc.) may be extended in accordance with the original the instruction received from the developer 104.

In some embodiments, the programming language instruction may include a format, syntax, etc. that is tailored for use with a database system. In one specific embodiment, a procedural language salesforce object query language (PL/SOQL) programming language instruction may be employed. In the present embodiment, the PL/SOQL is capable of serving as a procedural extension to an on-demand database centric service API that allows flow control and transaction control to execute on a server in conjunction with database APIs [e.g. SOQL, data manipulation language (DML), etc.]. The PL/SOQL can enable the capability to thread together multiple SOQL/DML statements as a single unit of work on the server. The PL/SOQL need not necessarily be considered a general purpose programming language, as it is heavily data focused, in some embodiments. It may, in one optional embodiment, be used by developers to interface with an on-demand database system, in contrast to traditional application developers' conventional tools, such as PL/SQL by Oracle®, Inc, of Redwood Shores, Calif. and others.

The present PL/SOQL embodiment may also include syntax and semantics intended to emulate that of Java, however, the present embodiment is not limited to Java. The PL/SOQL embodiments may include variable and expression syntax, block and conditional syntax, loop syntax, object and array notation, pass by reference, etc. Where embedded concepts that interface with on-demand database applications are provided, syntax and semantics that are easy to understand and which encourage efficient use of database APIs may also be employed.

More exemplary information regarding such PL/SOQL embodiment may be found with reference to U.S. Provisional Patent Application 60/828,757 entitled "PROGRAMMING LANGUAGE METHOD AND SYSTEM FOR EXTENDING APIS TO EXECUTE IN CONJUNCTION WITH AN ON-DEMAND DATABASE SERVICE," by Craig Weissman, filed Oct. 9, 2006, and U.S. Provisional Patent Application 60/828,192 entitled "PROGRAMMING LANGUAGE METHOD AND SYSTEM FOR EXTENDING APIS To EXECUTE IN CONJUNCTION WITH AN ON-DEMAND DATABASE SERVICE," by Craig Weissman, filed Oct. 4, 2006, the entire contents of which are incorporated herein by reference.

Figure 3:
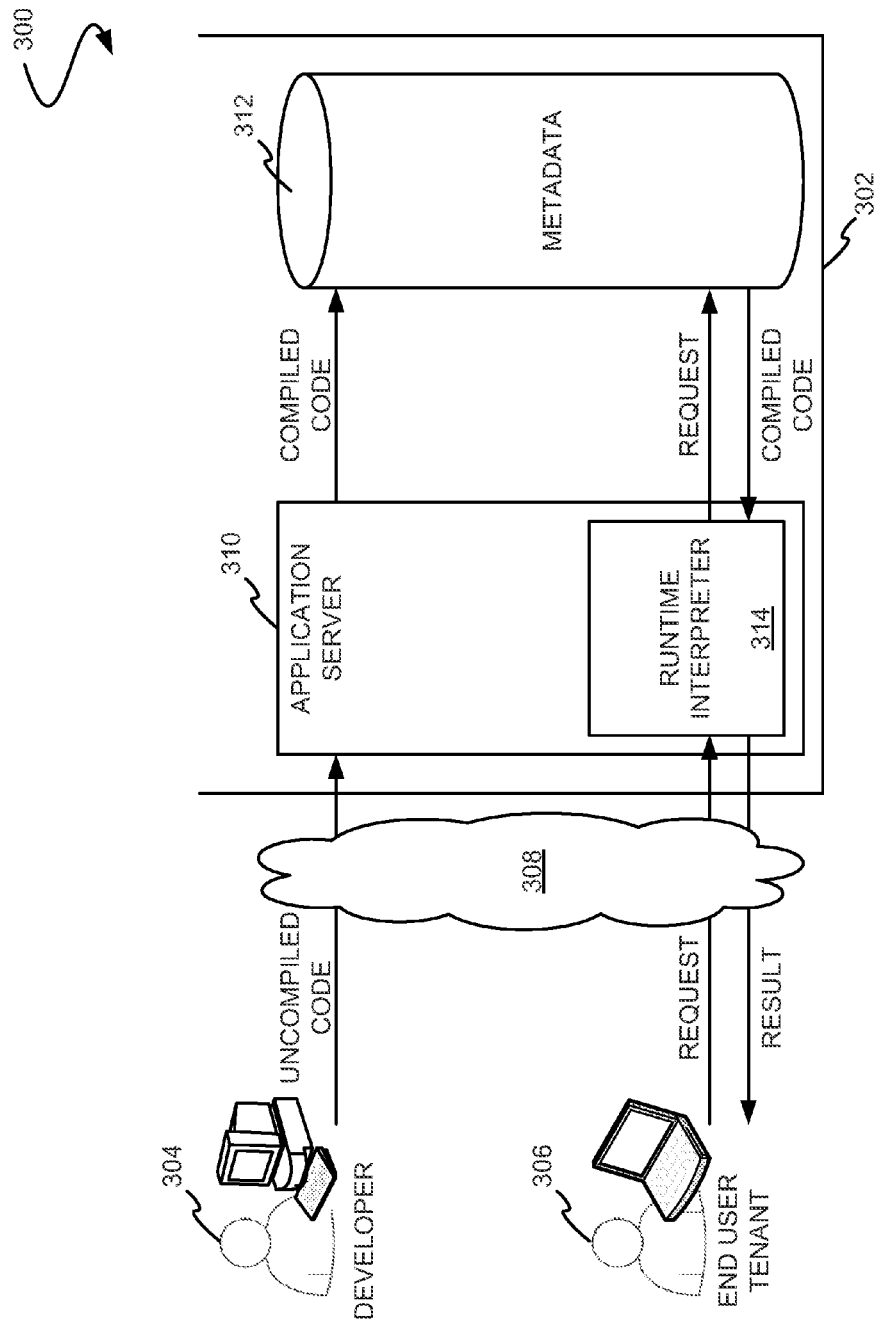
FIG. 3 shows a system for allowing access to developed applications via an on-demand database service, in accordance with another embodiment.

FIG. 3 shows a system 300 for allowing access to developed applications via an on-demand database service 302, in accordance with another embodiment. As an option, the present system 300 may be implemented in the context of the architecture and functionality of FIGS. 1-2. Of course, however, the system 300 may be carried out in any desired environment. Again, the aforementioned definitions may apply during the present description.

As shown, the on-demand database service 302 remains in communication with a developer 304 and at least one end user tenant 306 via a network 308. Further, the on-demand database service 302 includes an application server 310 that interfaces with the developer 304 and user tenant 306 differently. Specifically, the application server 310 may interface with the developer 304 during a compile-time phase, and the user tenant 306 during a runtime phase.

For example, the application server 310 is adapted to receive program language instructions (e.g. script, etc.) from the developer 304 who may, in one embodiment, intend to extend an API of the on-demand database service 302. In response to receiving such script, the application server 310 processes (e.g. compiles, etc.) and stores the same in a database 312. As an option, such processing may further include any of the desired controls mentioned earlier, to make sure that the developer 304 employs best practices, or any other predetermined practices in script development. In one embodiment, such compiled script may be stored in the form of metadata, for use in response to requests from the end user tenant 306. By this feature, the script may be adapted to be triggered in response to a particular associated request (e.g. request to select, access, modify, etc. an object) from the end user tenant 306.

Specifically, the application server 310 is further adapted for receiving requests from the end user tenant 306. In response to such requests, they are processed utilizing a run-time interpreter 314 of the application server 310, by using such request to identify and retrieve the correlating compiled script from the database 312. The run-time interpreter 314 is further equipped with the ability to processing the compiled script. The compiled script thus may dictate the manner in which the request is fulfilled, etc. As mentioned earlier, such compiled script may allow for more efficient retrieval of database information, and/or any other desired enhancement, etc.

Figure 4:
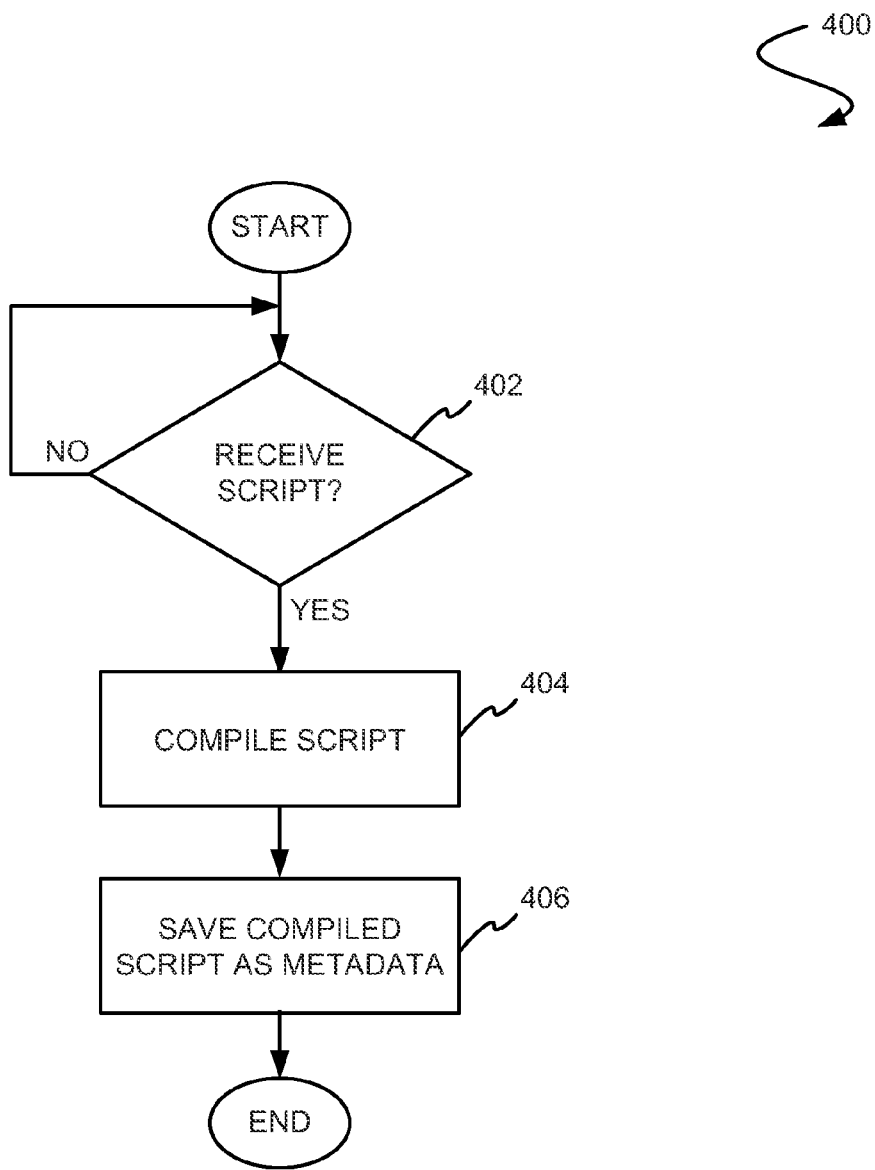
FIG. 4 shows a method for receiving and processing script from a developer, in accordance with yet another embodiment.

FIG. 4 shows a method 400 for receiving and processing script from a developer, in accordance with another embodiment. As an option, the present method 400 may be implemented in the context of the architecture and functionality of FIGS. 1-3. For example, the method 400 may represent functionality of the application server 310 of FIG. 3, with respect to the developer 304. Of course, however, the method 400 may be carried out in any desired environment. Again, aforementioned definitions may apply during the present description.

As shown, the present method 400 is triggered upon receipt of script from a developer. See decision 402. In response to such receipt, the script is compiled, as net forth in operation 404. In response to such compilation, the compiled script is stored in the form of metadata, as indicated in operation 406. To this end, the metadata is made available for retrieval and use in conjunction with requests by an end user tenant.

Figure 5:
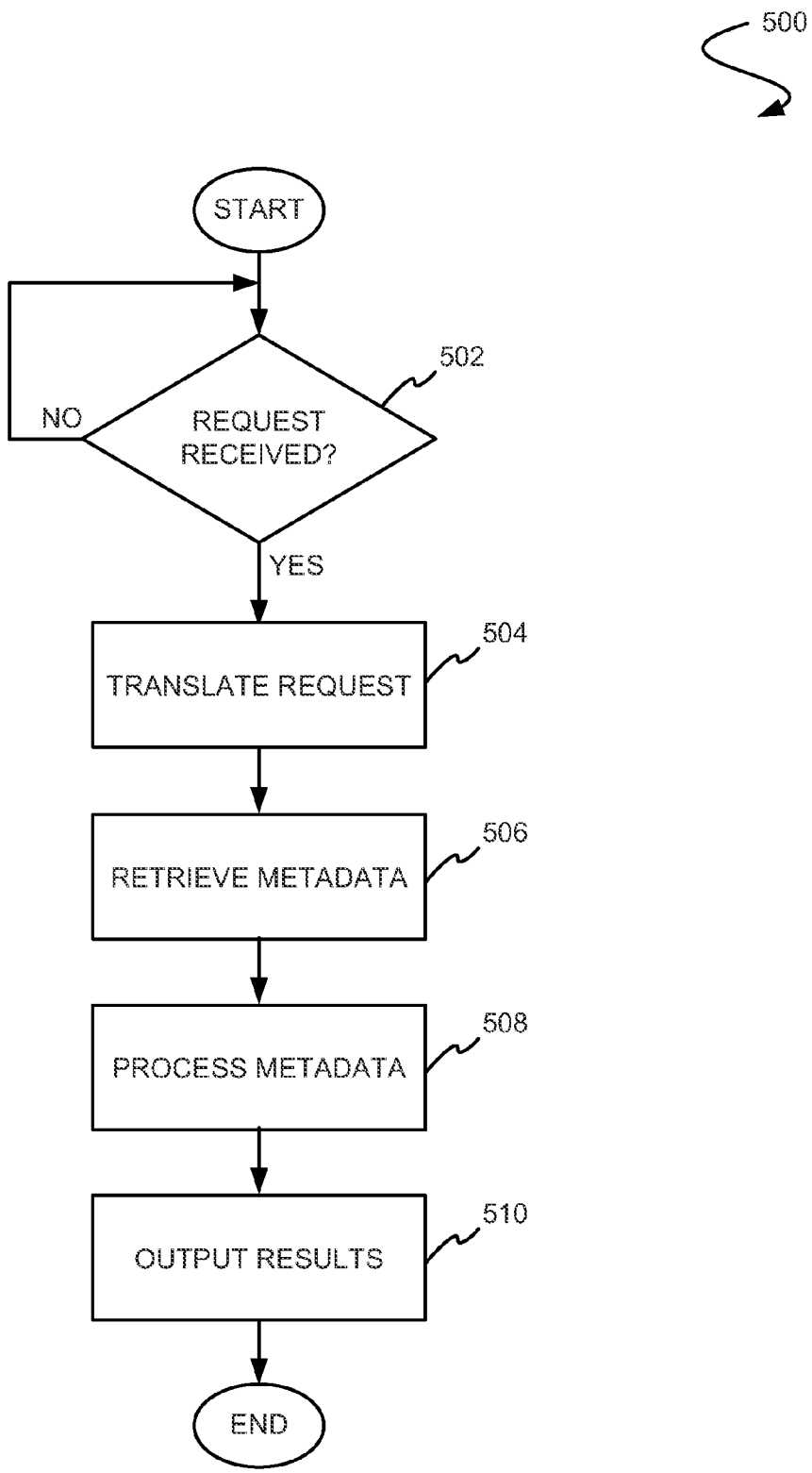
FIG. 5 shows a method for receiving and processing requests from an end user, in accordance with still yet another embodiment.

FIG. 5 shows a method 500 for receiving and processing requests from an end user, in accordance with another embodiment. As an option, the present method 500 may be implemented in the context of the architecture and functionality of FIGS. 1-3. For example, the method 500 may represent functionality of the application server 310 of FIG. 3, with respect to the end user tenant 306. Further, the method 500 may follow the method 400 of FIG. 4. Of course, however, the method 500 may be carried out in any desired environment. Yet again, aforementioned definitions may apply during the present description.

In decisions 502, it is first determined whether a request is received from an end user tenant. If so, such request is first translated in compliance with a format, protocol, etc. that may be used to retrieve metadata stored in a database (see operation 406 of FIG. 4). Note operations 506-508. Such metadata may then be processed at runtime, for affecting results returned to the end user tenant, as indicated in operation 510.

System Overview

Figure 6:
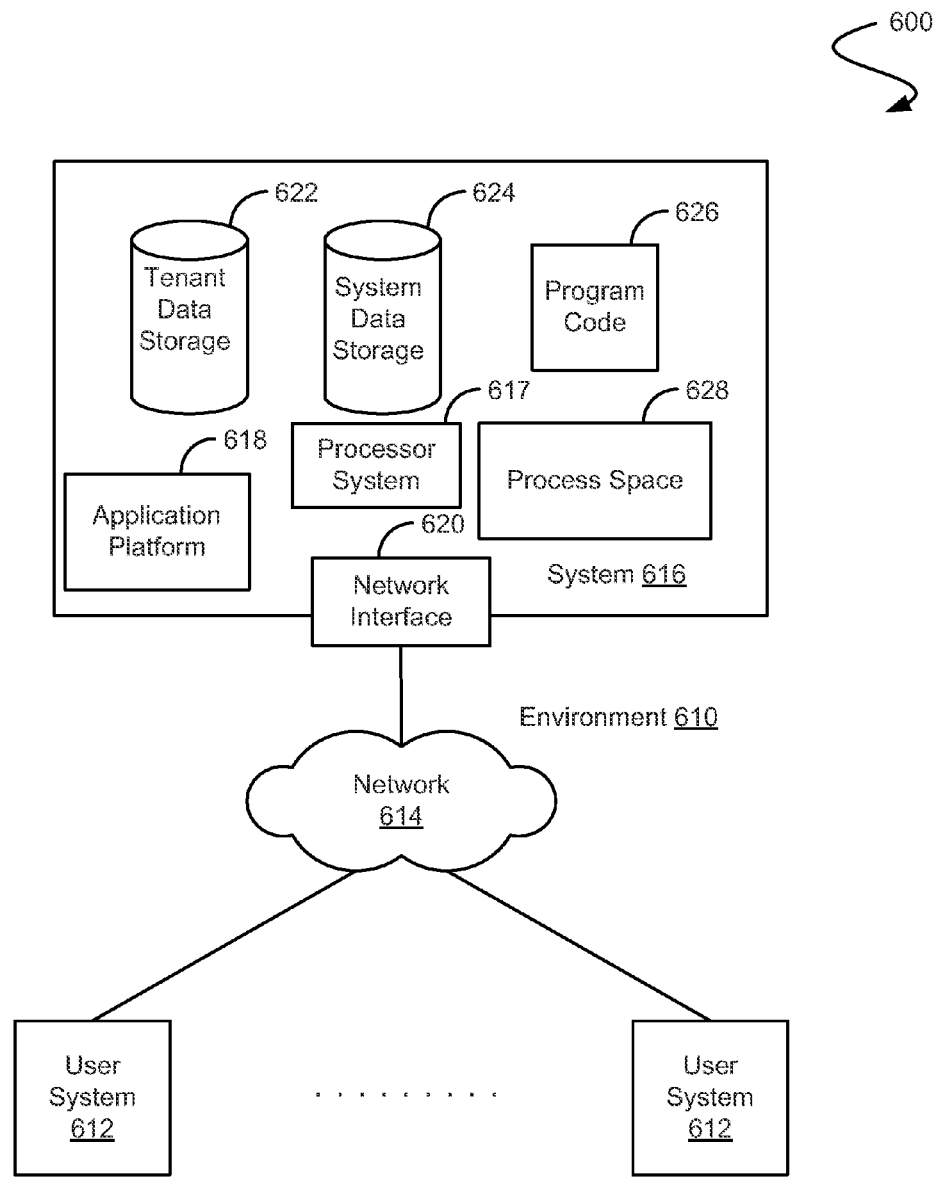
FIG. 6 illustrates a block diagram of an example of an environment wherein an on-demand database service might be used.

FIG. 6 illustrates a block diagram of an environment 610 wherein an on-demand database service might be used. As an option, any of the previously described embodiments of the foregoing figures may or may not be implemented in the context of the environment 610. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

Figure 7:
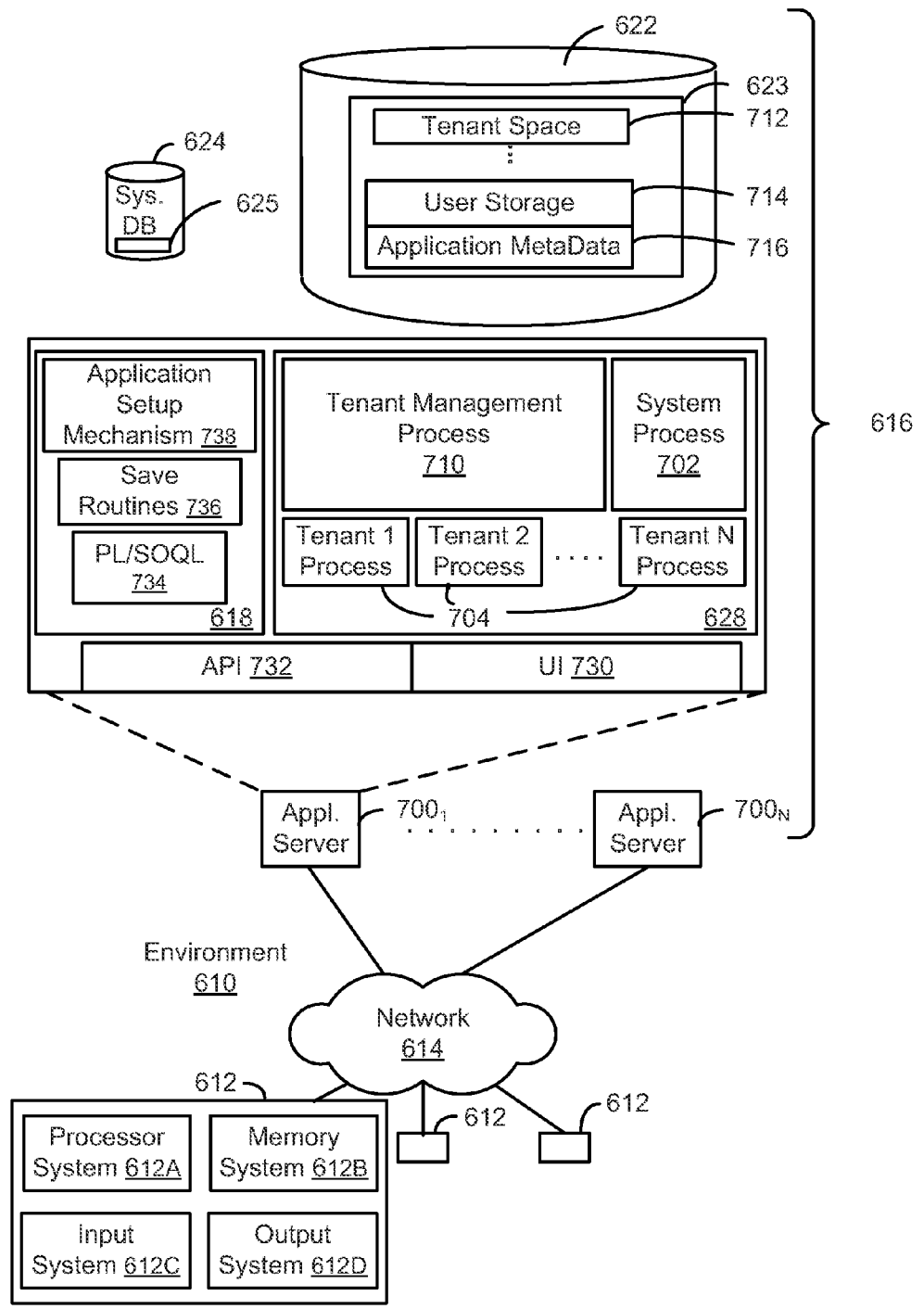
FIG. 7 illustrates a block diagram of an embodiment of elements of FIG. 6 and various possible interconnections between these elements.

One arrangement for elements of system 616 is shown in FIG. 7, including a network interface 620, application platform 618, tenant data storage 622 for tenant data 623, system data storage 624 for system data accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:

receiving developed applications at an on-demand database service from a plurality of developers;

for each of the received applications:

running in an automated manner, by the on-demand database service through a call made to an application program interface associated with the on-demand database service, an assessment of whether operability of the application and quality of the application comply with a plurality of predefined rules, only making, by the on-demand database service, a publication functionality of the on-demand database service accessible to the developer for the received application when the automated assessment performed by the on-demand database service indicates that the operability of the application and the quality of the application comply with the plurality of predefined rules, and when the automated assessment performed by the on-demand database service indicates that either the operability of the application or quality of the application does not comply with the plurality of predefined rules, then a report is provided to a developer of the application to indicate a manner in which the operability of the application or quality of the application does not comply with the plurality of predefined rules;

providing, by the on-demand database service, access to the applications, once published using the publication functionality of the on-demand database service, to users of the on-demand database service including allowing the users to share each of the applications; and limiting, by the on-demand database service, a plurality of aspects of the applications shared by the users, the plurality of aspects including:

a number of electronic mail messages sent utilizing the developed applications, an amount of resources made available to each of the developed applications, service calls out by the developed applications to other systems external to the on-demand database service, a number of queries made utilizing the developed applications, a number of rows processed, a number of transaction statements, a duration of processing by the developed applications, and a number of modification statements to a database made utilizing the developed applications.

2. The method of claim 1, wherein the resources include at least one of storage resources, processing resources, and bandwidth resources.

3. The method of claim 1, wherein the aspects of the applications that are limited further include a number of columns of a database.

4. The method of claim 1, wherein the aspects of the applications that are limited further include a number of rows returned by queries.

5. The method of claim 1, wherein the aspects of the applications that are limited further include a number of script statements between database statements.

6. The method of claim 1, wherein the aspects of the applications that are limited further include a total number of uncommitted rows since a last transaction control statement.

7. The method of claim 1, wherein the aspects of the applications that are limited further include a total number of script statements since a last database call.

8. The method of claim 1, wherein a single instance of each application is instantiated among the users.

9. The method of claim 1, further comprising compiling the applications.

10. The method of claim 9, wherein the compiled applications are capable of being processed by a run-time interpreter of the on-demand database service.

11. The method of claim 1, wherein only making, by the on-demand database service, the publication functionality of the on-demand database service accessible to the developer for the received application when the automated assessment performed by the on-demand database service indicates that the operability of the application and the quality of the application comply with the plurality of predefined rules includes:
    making, by the on-demand database service, the publication functionality of the on-demand database service accessible to the developer for the received application when the automated assessment performed by the on-demand database service indicates that the operability of the application and the quality of the application comply with the plurality of predefined rules, and
    precluding, by the on-demand database service, the publication functionality of the on-demand database service from being accessible to the developer for the received application when the automated assessment performed by the on-demand database service indicates that the operability of the application and/or the quality of the application do not comply with the plurality of predefined rules.

12. A computer program product embodied on a non-transitory computer readable medium including code adapted to be executed by a computer to perform a method comprising:
    receiving developed applications at an on-demand database service from a plurality of developers;
    for each of the received applications:
        running in an automated manner, by the on-demand database service through a call made to an application program interface associated with the on-demand database service, an assessment of whether operability of the application and quality of the application comply with a plurality of predefined rules,
        only making, by the on-demand database service, a publication functionality of the on-demand database service accessible to the developer for the received application when the automated assessment performed by the on-demand database service indicates that the operability of the application and the quality of the application comply with the plurality of predefined rules, and
        when the automated assessment performed by the on-demand database service indicates that either the operability of the application or quality of the application does not comply with the plurality of predefined rules, then a report is provided to a developer of the application to indicate a manner in which the operability of the application or quality of the application does not comply with the plurality of predefined rules;
    providing, by the on-demand database service, access to the applications, once published using the publication functionality of the on-demand database service, to users of the on-demand database service including allowing the users to share each of the applications; and
    limiting, by the on-demand database service, a plurality of aspects of the applications shared by the users, the plurality of aspects including:
        a number of electronic mail messages sent utilizing the developed applications,
        an amount of resources made available to each of the developed applications,
        service calls out by the developed applications to other systems external to the on-demand database service,
        a number of queries made utilizing the developed applications,
        a number of rows processed,
        a number of transaction statements,
        a duration of processing by the developed applications, and
        a number of modification statements to a database made utilizing the developed applications.

13. A system, comprising:
    a processor for:
        receiving developed applications at an on-demand database service from a plurality of developers;
        for each of the received applications:
            running in an automated manner, by the on-demand database service through a call made to an application program interface associated with the on-demand database service, an assessment of whether operability of the application and quality of the application comply with a plurality of predefined rules,
            only making, by the on-demand database service, a publication functionality of the on-demand database service accessible to the developer for the received application when the automated assessment performed by the on-demand database service indicates that the operability of the application and the quality of the application comply with the plurality of predefined rules, and
            when the automated assessment performed by the on-demand database service indicates that either the operability of the application or quality of the application does not comply with the plurality of predefined rules, then a report is provided to a developer of the application to indicate a manner in which the operability of the application or quality of the application does not comply with the plurality of predefined rules;
        providing, by the on-demand database service, access to the applications, once published using the publication functionality of the on-demand database service, to users of the on-demand database service including allowing the users to share each of the applications; and
        limiting, by the on-demand database service, a plurality of aspects of the applications shared by the users, the plurality of aspects including:
            a number of electronic mail messages sent utilizing the developed applications, an amount of resources made available to each of the developed applications,
service calls out by the developed applications to other systems external to the system,
a number of queries made utilizing the developed applications,
a number of rows processed,
a number of transaction statements,
a duration of processing by the developed applications, and
a number of modification statements to a database made utilizing the developed applications.

* * * * *